US006937822B2

(12) United States Patent
Noirie et al.

(10) Patent No.: US 6,937,822 B2
(45) Date of Patent: Aug. 30, 2005

(54) SWITCH FOR AN OPTICAL TRANSMISSION NETWORK USING WAVELENGTH DIVISION MULTIPLEXING

(75) Inventors: Ludovic Noirie, Bagneux (FR); Emmanuel Dotaro, Verrieres le Buisson (FR); Caroline Blaizot, Montigny le Bretonneux (FR)

(73) Assignee: Alcatel, Paris (FR)

(*) Notice: Subject to any disclaimer, the term of this patent is extended or adjusted under 35 U.S.C. 154(b) by 673 days.

(21) Appl. No.: 09/961,286

(22) Filed: Sep. 25, 2001

(65) Prior Publication Data

US 2002/0039215 A1 Apr. 4, 2002

(30) Foreign Application Priority Data

Oct. 2, 2000 (FR) .......................................... 00 12510

(51) Int. Cl.[7] .................................................. H04J 4/00
(52) U.S. Cl. ............................ 398/45; 398/50; 398/48; 398/49; 398/56
(58) Field of Search ............................ 385/17, 24, 82, 385/34, 27; 398/49, 46; 370/401

(56) References Cited

U.S. PATENT DOCUMENTS

| | | | | |
|---|---|---|---|---|
| 6,404,940 B1 * | 6/2002 | Tsuyama et al. | .............. | 385/17 |
| 6,512,612 B1 * | 1/2003 | Fatehi et al. | .................. | 398/49 |

FOREIGN PATENT DOCUMENTS

| | | |
|---|---|---|
| DE | 199 06 813 A1 | 9/2000 |
| EP | 1 030 481 A1 | 8/2000 |
| GB | 2 346 280 A | 8/2000 |

OTHER PUBLICATIONS

M. Jinno et al, "Ultra–Wide Band WDM Networks and Supporting Technologies", Core Networks and Network Management, Amsterdam, 1999, pp. 90–97 XP000829416.

Harada K et al.: "Hierarchical Optical Path Cross–Connect Systems for Large Scale WDM Networks", OFC/IOOC '99 Optical Fiber Communication Conference / International Conference on Integrated Optics and Optical Fiber Communication. San Diego, CA, Feb. 21–26, 1999, Optical Fiber Communication Conference on Integrated OP, Feb. 21, 1999, pp. 356–358, XP002175854.

* cited by examiner

*Primary Examiner*—M. R. Sedighian
*Assistant Examiner*—David C. Payne
(74) *Attorney, Agent, or Firm*—Sughrue Mion, PLLC

(57) ABSTRACT

A switch for an optical transmission network using wavelength division multiplexing has p1 input ports receiving p1 wavelengths and first switching means for switching the p1 wavelengths to p2 output ports, q1 input ports receiving q1 bands of wavelengths and second switching means for switching the q1 bands to q2 output ports, r1 input ports receiving r1 groups of bands and third switching means for switching the r1 groups of bonds to r2 output ports. The three switching means consist of a single switching matrix adapted to couple any of the p1+q1+r1 input ports to any of the p2+q2+r2 output ports. This single-matrix architecture can switch all the granularities at the same time, which facilitates reconfiguration as a function of evolution of the traffic to be switched.

6 Claims, 2 Drawing Sheets

-- PRIOR ART --

SWITCH FOR AN OPTICAL TRANSMISSION NETWORK USING WAVELENGTH DIVISION MULTIPLEXING

CROSS-REFERENCE TO RELATED APPLICATIONS

This application is based on French Patent Application No. 00 12 510 filed Oct. 2, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a switch for use in an optical communication network using wavelength division multiplexing.

2. Description of the Prior Art

The present invention is in the field of optical switches or optical switching nodes having a "multigranularity" architecture. The "granularity" concept relates to predefined sets of transmission resources (typically carrier wavelengths or wavelength division multiplexes). The resources of this kind of set can be considered as a whole for the purposes of some common processing (typically switching). A multigranularity architecture therefore takes account of different levels of granularity to switch the total traffic at a switch. For example, a portion of the total traffic can be switched at the "fiber" level, i.e. grouping together all wavelengths that can be conveyed by an optical fiber, which therefore corresponds to the highest level of granularity. Another portion can be switched at the band of wavelengths level, which corresponds to an intermediate level of granularity. A final portion can be switched at the wavelength level, which corresponds to the lowest level of granularity. Intermediate levels of granularity can be further defined.

Using a multigranularity architecture limits the increase in the complexity of the switches in optical networks.

Telecommunications are currently expanding at a very great rate, reflected in increasing demands for data transmission. Fiber optic transmission is particularly affected by this phenomenon and the quantity of data transmitted via optical networks is constantly increasing. This is reflected in an increase in the number of fibers installed in networks and the number of carrier wavelengths used.

As of now, an optical fiber is capable of transmitting up to 256 wavelengths and each wavelength can convey a data bit rate of 10 gigabits per second (1 Gbit=$10^9$ bits). Accordingly, depending on the number of fibers arriving at the input of the optical switch, the total bit rate to be switched can be in excess of several tens of terabits per second (1 Tbit=$10^{12}$ bits).

An optical switch with a multigranularity architecture processes data bit rates of this magnitude by switching partly wavelengths and partly bands of wavelengths, i.e. single-wavelength channels and wavelength multiplexes, respectively. The switch can further process groups of bands. Another possibility would be to process only bands of wavelengths and groups of bands. To simplify the description, the remainder of the description covers, by way of example only, three levels of granularity: wavelength, band and "fiber", the latter level corresponding to a special case of groups of bands combining all wavelengths that can be conveyed by an optical fiber.

FIG. 1 is a diagram of a prior art optical switching node with a multigranularity architecture.

With the multigranularity architecture, it has been possible to evolve from monoblock switching nodes to switching nodes consisting of a stack of subnodes. Each switching subnode is assigned to a corresponding level of granularity. Thus in the example shown there is a switching subnode FXC associated with the "fiber" level of granularity (which is a special case of groups of bands), a switching subnode BXC associated with the "band" level of granularity, and a switching subnode WXC associated with the "wavelength" level of granularity.

In FIG. 1, the incoming fibers IF are first routed to the input ports IP of the switching subnode FXC. A few of the incoming fibers IF are switched directly to the output fibers OF via the output ports OP of the switching subnode FXC. A fiber AF coming from the client is directly inserted at a fiber insertion port $P_{ins}$ of the switching subnode FXC. A fiber DF to the client is extracted from a fiber extraction port $P_{ext}$ of the subnode FXC. The fiber DF must be wavelength division demultiplexed for the client, but the demultiplexers are not shown in the figure. Fibers $F_{bf}$ are inserted from the switching subnode BXC to the fiber insertion ports $P_{ins}$ of the subnode FXC. These fibers $F_{bf}$ come from the band to fiber multiplexer Mux B→F which multiplexes the bands coming from the output ports OP of the switching subnode BXC. Finally, fibers $F_{fb}$ are extracted from the subnode FXC via extraction ports and are sent to the input ports IP of the subnode BXC after the fibers are demultiplexed into bands in the fiber to band demultiplexer Demux F→B.

The same switching process is used at the next lower level of granularity, i.e. in the switching subnode BXC at the band level of granularity, as well as at the lowest level of granularity, i.e. in the switching subnode WXC at the wavelength level of granularity.

A few of the bands arriving at the input ports IP of the subnode BXC are switched to the output ports OP of the subnode BXC. A band AB coming from the client is directly inserted at an insertion port of the subnode BXC. A band DB sent to the client is extracted via an extraction port $P_{ext}$ of the subnode BXC. The bond DB must be wavelength division demultiplexed for the client but the demultiplexers are not shown in the figure. Bands $B_{\lambda b}$ are inserted from the switching subnode BXC at the insertion ports $P_{ins}$ of the subnode BXC. These bands $B_{\lambda b}$ come from the multiplexer Mux λ→B which multiplexes wavelengths from the output ports OP of the switching subnode BXC into bands. Finally, bands $B_{b\lambda}$ are extracted from the subnode BXC via extraction ports and are sent to the input ports IP of the subnode WXC after the bands are demultiplexed into wavelengths in the band to wavelength demultiplexer Demux B→λ.

The same switching process is used again in the subnode WXC. A few of the wavelengths arriving at the input ports IP of the subnode WXC are switched to the output ports OP of the subnode WXC. Wavelengths Aλ coming from the client are directly inserted at insertion ports $P_{ins}$ of the subnode WXC. Wavelengths Dλ sent to the client are extracted via extraction ports of the subnode WXC.

This prior art architecture just described with reference to FIG. 1 uses separate switching matrices for each level of granularity (typically based on "crossbar" optical switches). The fiber level of granularity is processed in the switching matrix FXC, the band level of granularity is processed in the switching matrix BXC, and the wavelength level of granularity is processed in the switching matrix WXC. There is therefore a dedicated switching matrix for each granularity.

For given numbers of input ports assigned to the three levels of granularity, this solution represents the optimum in terms of limiting the complexity and size of the overall system.

However, because the number of input/output ports of each switching matrix allocated to each level of granularity is fixed, this becomes a drawback if evolving the architecture to adapt it to changes in traffic with time is envisaged.

Consider a concrete example of this kind of architecture with a bit rate of 10 Gbit/s per wavelength, 16 wavelengths per band and 10 bands per fiber. It may be necessary to switch:

in an initial step: 500 wavelengths, no band, no fiber, which represents a total bit rate of 5 Tbit/s;

in a second step: 250 wavelengths, 250 bands, no fiber, which represents a total bit rate of 42.5 Tbit/s;

in a third step: 100 wavelengths, 400 bands, no fiber, which represents a total bit rate of 65 Tbit/s;

in a fourth step: 100 wavelengths, 300 bands, 100 fibers, which represents a total bit rate of 209 Tbit/s; and in a fifth step: no wavelength, 200 bands, 300 fibers, which represents a total bit rate of 512 Tbit/s.

The first step requires a 500×500 switching matrix WXC (which means a number of states of the matrix equal to 500×500) for the wavelength granularity. However, the switching matrix WXC will not be used completely in subsequent steps.

The third step requires a 400×400 switching matrix BXC for the band granularity. However, only half of the input/output ports of that matrix will be used in the fifth step.

Finally, the fifth step requires a 300×300 switching matrix FXC for the fiber granularity. Once again, the switching matrix is under-used in the other steps.

Accordingly, with the preceding example of evolution, using the prior art architecture, the total number of input ports to be provided in the optical switch is equal to 1 200, and those ports will be only partially used.

Also, the object of the present invention is to provide an architecture for switching different levels of granularity that avoids the drawbacks of the prior art, i.e. an architecture that is optimized not at a given stage of the evolution of the traffic to be switched but for a set of configurations adapted throughout that evolution.

To this end, the invention proposes to use only one switching matrix to switch all levels of granularity at the same time. The three separate switching matrices of the prior art, respectively corresponding to the fiber, band and wavelength levels of granularity, are replaced by a single switching matrix that processes all granularities. Depending on what is required, i.e. depending on the traffic to be switched, appropriate numbers of ports of the single matrix are respectively assigned to a low level of granularity (wavelengths), to an intermediate level of granularity (bands of wavelengths), and finally to a high level of granularity (fibers).

SUMMARY OF THE INVENTION

The invention therefore provides an optical switch for an optical network using wavelength division multiplexing, the switch including:

p1 input ports receiving p1 respective wavelengths, p2 output ports, and first switching means for switching the wavelengths received at the p1 input ports selectively to the p2 output ports, and/or q1 input ports receiving q1 respective bands of wavelengths, q2 output ports, and second switching means for switching the bands of wavelengths received at the q1 input ports selectively to the q2 output ports, and/or r1 input ports receiving r1 respective groups of bands, r2 output ports, and third switching means for switching the groups of bands received at the r1 input ports selectively to the r2 output ports, the switch including at least two of the first, second and third switching means, which consist of a single switching matrix able to couple any of the p1+q1+r1 input ports to any of the p2+q2+r2 output ports.

Other features and advantages of the invention will become more clearly apparent on reading the following description of one particular embodiment of the invention, which description is given with reference to the accompanying drawings.

DETAILED DESCRIPTION OF THE PREFERRED EMBODIMENT

In the preferred embodiment of the invention described below with reference to FIG. 2, there are three levels of granularity: wavelength, band of wavelengths and fiber. The invention can nevertheless be implemented with two or more than three levels of granularity.

Incoming fibers IF are received at the input of the switch 1 which delivers outgoing fibers OF at the output. A series of wavelengths Aλ coming from the client is also added at the switch 1 and a series of wavelengths Dλ sent to the client is extracted at the switch 1.

The switch 1 uses a single multigranularity switching matrix MXC which has a first series of p1 input ports IλP assigned to the wavelength level of granularity to receive p1 respective wavelengths, a second series of q1 input ports IBP assigned to the band of wavelengths level of granularity to receive q1 respective bands of wavelengths, and a third series of r1 input ports IFP assigned to the fiber level of granularity to receive r1 respective fibers.

The single matrix MXC also includes, in corresponding relationship with the input ports, a first series of P2 output ports OλP assigned to the wavelength level of granularity, a second series of q2 output ports OBP assigned to the band of wavelengths level of granularity, and a third series of r2 output ports OFP assigned to the fiber level of granularity.

Figure 1:
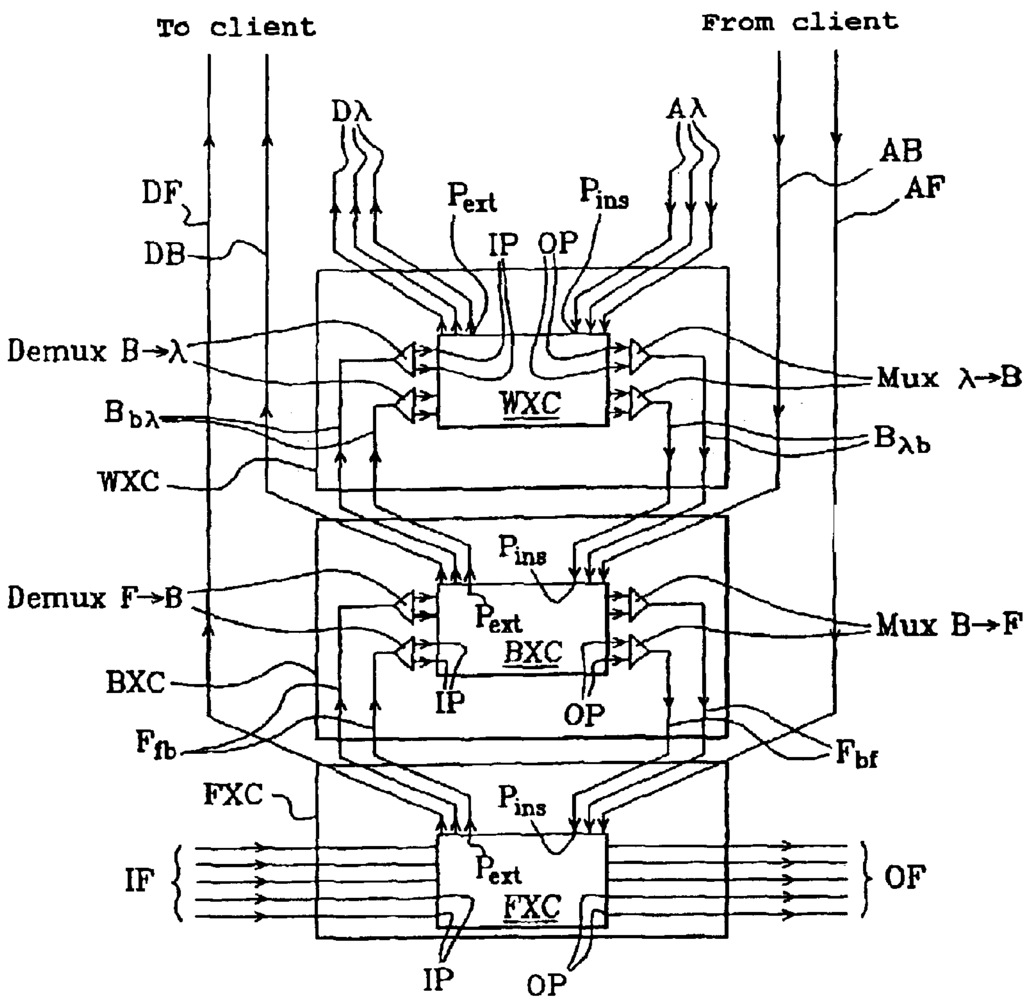
FIG. 1 is a diagram of an optical switch using a prior art multigranularity architecture, as described in the above preamble.
Figure 2:
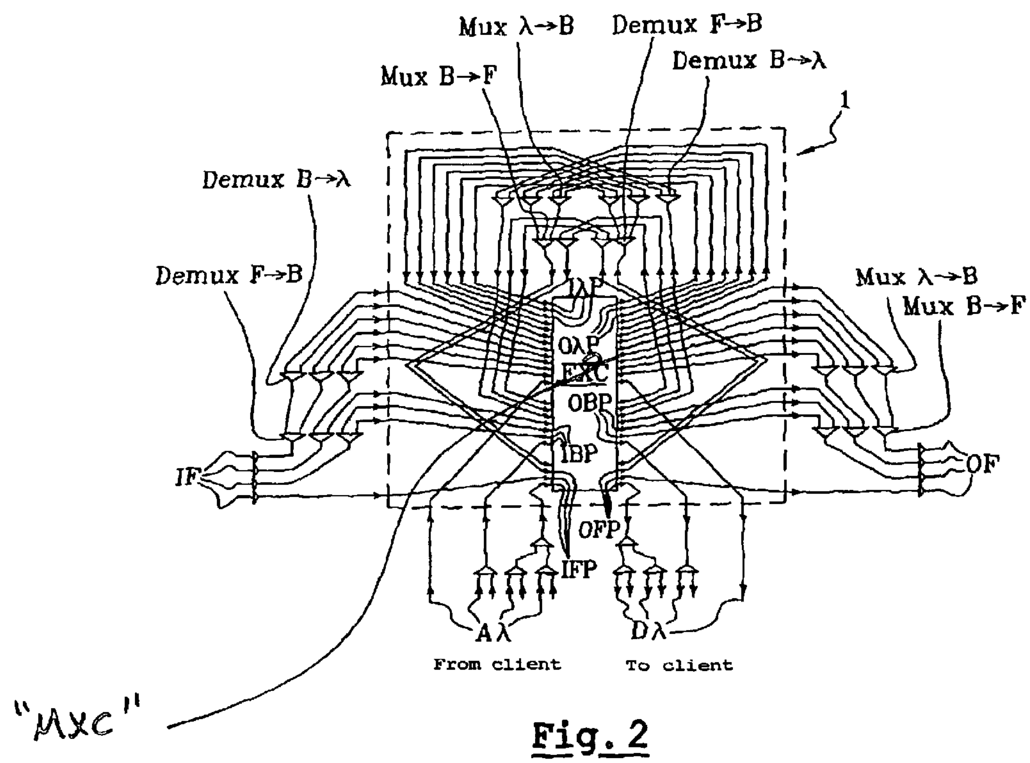
FIG. 2 is a diagram of an optical switch in accordance with the invention.

At the input of the switch 1, whose core is delimited by a dashed line in FIG. 2, is an input interface consisting of a set of fiber to band demultiplexers Demux F→B and band to wavelength demultiplexers Demux B→λ. At the output of the switch 1 is an output interface consisting of a set of wavelength to band multiplexers Mux λ→B and band to fiber multiplexers Mux B→F. The output interface can also include wavelength converters, band converters and/or regenerators, not shown in FIG. 2. Their presence is optional, however.

In the core of the switch 1 is an internal rearrangement area consisting, on the one hand, of a set of fiber to band demultiplexers Demux F→B and band to wavelength demultiplexers Demux B→λ, of the same type as those previously described, and, on the other hand a set of wavelength to band multiplexers Mux λ→B and band to fiber multiplexers Mux B→F, also of the same type as those previously described.

Some of the incoming fibers IF, after first being demultiplexed into bands by the fiber to band demultiplexers Demux F→B, are further demultiplexed into wavelengths by the band to wavelength demultiplexers Demux B→λ and are then sent to the p1 input ports IλP assigned to wavelengths of the single matrix MXC. The wavelengths are then switched by first switching means to the p2 output ports OλP assigned to wavelengths of the matrix MXC. The first switching means consist of the single switching matrix MXC and switch the wavelengths received at the p1 input ports assigned to wavelengths selectively to p2 output ports assigned to wavelengths.

Other incoming fibers IF are demultiplexed into bands of wavelengths by the fiber to band demultiplexers Demux F→B and are sent to the q1 input ports IBP assigned to bands of wavelengths of the matrix MXC. The bands of wavelengths are then switched by second switching means to the q2 output ports OBP assigned to bands of wavelengths of the matrix MXC. The second switching means consist of the single switching matrix MXC and switch the bands of wavelengths received at the q1 input ports selectively to the q2 output ports.

Finally, some incoming fibers IF are sent directly to the r1 input ports IFP assigned to fibers of the matrix MXC to be switched by the third switching means to the r2 output ports OFP assigned to fibers of the matrix MXC. The third switching means consist of the single switching matrix MXC and switch the fibers received at the r1 input ports selectively to the r2 output ports.

At the level of the output ports OλP assigned to the wavelength granularity, some wavelengths are directed to the output interface and are then multiplexed into bands and then into fibers by the wavelength to band multiplexers Mux λ→B and band to fiber multiplexers Mux B→F. Other wavelengths can be directed to the internal rearrangement area. Those wavelengths can then be looped to the switching matrix MXC, on the one hand, at the level of the input ports IBP assigned to the band granularity via wavelength to band multiplexers Mux λ→B in the internal rearrangement area and, on the other hand, at the level of the input ports IFP assigned to the fiber granularity by wavelength to band multiplexers Mux λ→B and band to fiber multiplexers Mux B→F.

At the output ports OBP assigned to the band granularity, some bands are directed directly to the output interface and are multiplexed into fibers by band to fiber multiplexers Mux B→F. Other bands can be directed to the internal rearrangement area. Those bands can then be looped to the switching matrix MXC, on the one hand, at the input ports IλP assigned to the wavelength granularity by band to wavelength demultiplexers Demux B→λ in the internal arrangement area, and, on the other hand, at the input ports IFP assigned to the fiber granularity by band to fiber multiplexers Mux B→F.

At the output ports OFP assigned to the fiber granularity, some fibers are directed directly to the output interface. Other fibers can be directed to the internal rearrangement area. Those fibers can then be looped to the switching matrix MXC, on the one hand, at the input ports IBP assigned to the band granularity by fiber to band demultiplexers Demux F→B in the internal rearrangement area, and, on the other hand, at the input ports IλP assigned to the wavelength granularity by fiber to band demultiplexers Dmux F→B and band to wavelength demultiplexers Demux B→λ.

One advantage of the invention is that this single-matrix architecture can switch all the granularities at the same time and is more flexible as a function of evolution of the traffic to be switched in the optical switch. The single switching matrix used in the switch in accordance with the invention con couple any of the p1+q1+r1 input ports to any of the p2+q2+r2 output ports, even if all possible states of the switch are not generally used for a given multigranularity configuration.

Accordingly, input/output ports that were assigned to wavelengths can subsequently be assigned to bands of wavelengths to increase the capacity of the matrix in terms of bit rate. The capacity is increased without changing the space switch and by operating at the level of the input and output interfaces and the internal rearrangement area, i.e. by modifying the connections at the level of the demultiplexers and the multiplexers. This kind of switching matrix can therefore adapt to increasing data bit rates through being able to change capacity at will.

The single switching matrix MXC uses the same technology as the fiber level of granularity switching matrices used in the prior art architectures employing a separate switching matrix for each granularity.

In one particular embodiment of the invention, the input interface and the output interface as described previously are dispensed with. Demultiplexing at the input of the switch 1 and multiplexing at the output are therefore dispensed with and the switch 1 uses only the internal rearrangement area, consisting of the set of multiplexers and demultiplexers situated within the architecture. In this particular embodiment, all input to the switch 1 is at the fiber level of granularity. The fibers are then directed to the internal rearrangement area to be demultiplexed to the band level of granularity and then to the wavelength level of granularity.

What is claimed is:

1. An optical switch for an optical network using wavelength division multiplexing, said switch having a multi-granularity architecture and said switch comprising:

- p1 input ports receiving p1 respective wavelengths, p2 output ports, and first switching means for switching the wavelengths received at said p1 input ports selectively to said p2 output ports,
- q1 input ports receiving q1 respective bands of wavelengths, q2 output ports, and second switching means for switching the bands of wavelengths received at said q1 input ports selectively to said q2 output ports, and wherein said second switching means is dedicated to switching the bands of the wavelengths without proceeding to a spatial separation of the wavelengths which constitute the bands, and
- r1 input ports receiving r1 respective groups of bands, r2 output ports, and third switching means for switching the groups of bands received at said r1 input ports selectively to said r2 output ports, and wherein said third switching means is dedicated to switching the groups of bands without proceeding to a spatial separation of either of the bands or of the wavelengths which constitute the groups of bands, wherein said switch further comprises at least two of said first, second and third switching means, which comprise a single switching matrix able to couple any of said p1+q1+r1 input ports to any of said p2+q2+r2 output ports.

2. The switch claimed in claim 1, comprising an internal rearrangement area comprising a set of group of bands to band at least one of a plurality of demultiplexers and band to wavelength demultiplexers.

3. The switch claimed in claim 2, further comprising an input interface comprising at least one of a set of group of bands to band demultiplexers and band to wavelength demultiplexers and an output interface comprising at least one of a set of wavelength to band multiplexers and band to group of bands multiplexers.

4. The switch claimed in claim 1, comprising an internal rearrangement area comprising at least one of a set of wavelength to band multiplexers and band to group of bands multiplexers.

5. The switch claimed in claim 4, further comprising an input interface comprising at least one of a set of group of bands to band demultiplexers and band to wavelength demultiplexers and an output interface comprising at least one of a set of wavelength to band multiplexers and band to group of bands multiplexers.

6. The switch claimed in claim 5, wherein said output interface further includes at least one of a plurality of wavelength converters, bands of wavelength converters, and regenerators.

* * * * *